United States Patent
Lauer et al.

(10) Patent No.: US 9,677,450 B2
(45) Date of Patent: Jun. 13, 2017

(54) EXHAUST GAS RETREATMENT SYSTEM OF AN INTERNAL COMBUSTION ENGINE AND METHOD FOR OPERATING THE SAME

(71) Applicants: Peter Lauer, Augsburg (DE); Andreas Döring, Munich/Unterhaching (DE)

(72) Inventors: Peter Lauer, Augsburg (DE); Andreas Döring, Munich/Unterhaching (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 14/481,368

(22) Filed: Sep. 9, 2014

(65) Prior Publication Data
US 2015/0068195 A1    Mar. 12, 2015

(30) Foreign Application Priority Data
Sep. 10, 2013   (DE) .................. 10 2013 014 990

(51) Int. Cl.
| | |
|---|---|
| *F01N 11/00* | (2006.01) |
| *F01N 9/00* | (2006.01) |
| *F01N 3/023* | (2006.01) |
| *G01M 15/10* | (2006.01) |
| *F01N 13/00* | (2010.01) |

(52) U.S. Cl.
CPC .............. *F01N 9/002* (2013.01); *F01N 3/023* (2013.01); *F01N 9/007* (2013.01); *F01N 11/007* (2013.01); *F01N 13/009* (2014.06); *G01M 15/104* (2013.01); *F01N 2430/06* (2013.01); *F01N 2560/025* (2013.01); *F01N 2560/026* (2013.01); *F01N 2900/1606* (2013.01); *Y02T 10/47* (2013.01)

(58) Field of Classification Search
CPC .... F01N 3/023; F01N 9/002; F01N 2560/025; F01N 2560/026; F01N 2900/1606; F02D 41/029; F02D 2200/0812
See application file for complete search history.

(56) References Cited

U.S. PATENT DOCUMENTS

| | | | |
|---|---|---|---|
| 8,327,628 B2 | 12/2012 | Ruona et al. | |
| 8,359,840 B2 | 1/2013 | Van Nieuwstadt et al. | |
| 8,408,055 B2 | 4/2013 | Van Nieuwstadt et al. | |
| 8,850,798 B2 | 10/2014 | Brown et al. | |
| 2004/0204818 A1* | 10/2004 | Trudell | ................ F01N 3/0253 701/114 |
| 2005/0086933 A1* | 4/2005 | Nieuwstadt | ........... F01N 3/0842 60/297 |
| 2007/0044455 A1* | 3/2007 | Barasa | ................... F01N 3/035 60/295 |

(Continued)

FOREIGN PATENT DOCUMENTS

| | | |
|---|---|---|
| DE | 10 2009 005 733 A1 | 7/2010 |
| DE | 10 2010 032 545 A1 | 2/2011 |

(Continued)

*Primary Examiner* — Jonathan Matthias
(74) *Attorney, Agent, or Firm* — Cozen O'Connor

(57) ABSTRACT

An exhaust gas retreatment system of an internal combustion engine includes a particle filter; and a sensor positioned, in a flow direction of the exhaust gas, downstream of the particle filter. The sensor is configured to measure the oxygen content and/or the NOx content in the exhaust gas downstream of the particle filter.

5 Claims, 1 Drawing Sheet

(56) References Cited

U.S. PATENT DOCUMENTS

| | | |
|---|---|---|
| 2011/0023590 A1* | 2/2011 | Van Nieuwstadt et al. .......................... 73/114.73 |
| 2011/0219746 A1* | 9/2011 | Yezerets ................. F01N 3/035 60/274 |

FOREIGN PATENT DOCUMENTS

| | | |
|---|---|---|
| DE | 10 2010 046 747 A1 | 3/2011 |
| DE | 10 2010 044 067 A1 | 5/2011 |
| DE | 10 2010 046 751 A1 | 5/2011 |
| DE | 10 2012 207 717 A1 | 11/2012 |

* cited by examiner

EXHAUST GAS RETREATMENT SYSTEM OF AN INTERNAL COMBUSTION ENGINE AND METHOD FOR OPERATING THE SAME

CROSS-REFERENCE TO RELATED APPLICATION

This application claims priority to German Application No. DE 102 013 014 990.8, filed Sep. 10, 2013, the content of which is incorporated by reference herein.

BACKGROUND OF THE INVENTION

1. Field of the Invention

The invention relates to an exhaust gas retreatment system of an internal combustion engine. The invention furthermore relates to a method for operating such an exhaust gas retreatment system.

2. Description of the Related Art

From practice, exhaust gas retreatment systems of internal combustion engines are known. Such systems comprise a particle filter, at least one exhaust gas retreatment assembly, which is arranged, with respect to the flow direction of the exhaust gas, upstream of the particle filter, and, if appropriate, an exhaust gas retreatment assembly positioned, seen in the flow direction of the exhaust gas, downstream of the particle filter. An exhaust gas retreatment assembly which, in the flow direction of the exhaust gas, is positioned upstream of the particle filter is in particular an oxidation catalytic converter. An exhaust gas retreatment assembly, which is positioned downstream of the particle filter, can be an SCR-catalytic converter and/or a silencer and/or a heat exchanger and/or a desulphurisation assembly. The term particle filter is used to mean both conventional particle filters, through which exhaust gas flows, and also particle separators, in the case of which the exhaust gas flow is conducted along a separating structure.

In particular when, seen in flow direction of the exhaust gas, an oxidation catalytic converter is positioned upstream of the particle filter, nitrogen monoxide (NO) in the exhaust gas is oxidized into nitrogen dioxide ($NO_2$) in the oxidation catalytic converter with the help of the residual oxygen ($O_2$) contained in the exhaust gas flow according to the following equation:

$$2NO + O_2 \rightarrow 2NO_2$$

During this oxidation of nitrogen monoxide into nitrogen dioxide the equilibrium of the oxidation reaction at high temperatures is on the side of nitrogen monoxide. As a result the achievable component of nitrogen dioxide is greatly limited at high temperatures.

In the particle filter, the nitrogen dioxide extracted in the oxidation catalytic converter is converted with carbon-containing particles collecting in the particle filter, so called soot, into carbon monoxide (CO), carbon dioxide ($CO_2$), nitrogen ($N_2$) and nitrogen monoxide (NO). Here, in the sense of a passive regeneration of the particle filter, a continuous removal of the carbonaceous fine material particles or of the soot deposited in the particle filter takes place, this conversion taking place according to the following equations:

$$2NO_2 + C \rightarrow 2NO + CO_2$$

$$NO_2 + C \rightarrow NO + CO$$

$$2C + 2NO_2 \rightarrow N_2 + 2CO_2$$

In particular when, with such a passive regeneration of the particle filter, no complete conversion of the carbonaceous fine material particles or of the soot deposited in the particle filter can take place, the carbon component or soot component in the particle filter increases, wherein the particle filter then has a tendency towards clogging, as a result of which ultimately the exhaust gas backpressure at an internal combustion engine situated upstream of the exhaust gas retreatment system increases.

A rising exhaust gas backpressure at the internal combustion engine reduces the power of the internal combustion engine and causes increased fuel consumption.

In order to avoid an increase of the quantity of carbonaceous fine material particles or of the soot in the particle filter and thus a clogging of the same, it is already known from practice to provide particle filters with a catalytic coating. Here, platinum-containing coatings are preferentially employed. The use of such particle filters with catalytic coating, however, can only insufficiently prevent the charging of the particle filter with carbonaceous fine material particles, i.e., with soot, at low exhaust gas temperatures.

If the soot charge of the particle filter exceeds a certain limit, which depending on the filter material is between 3 and 10 g of soot/l of filter substrate, uncontrolled ignition of the soot can occur. In this case, the soot combusts suddenly, which because of the exothermic of the carbon oxidation results in a temperature increase of above 1000° C., which results in a thermal damaging of the filter material.

Furthermore, employing active regeneration of the particle filter is known from practice for reducing the charging of a particle filter with soot. In the case of such an active regeneration of the particle filter, the exhaust gas temperature is periodically actively raised to 500° C. to 650° C., for example through the addition of fuel to the exhaust gas flow, in order to burn off carbonaceous fine material particles or soot particles which have accumulated in the particle filter by way of an exothermic reaction or oxidation of the hydrocarbons. The burning-off of the carbon with the help of oxygen in a particle filter in this case takes place according to the following equation:

$$C + O_2 \rightarrow CO_2$$

At the greatly elevated temperatures, a conversion of nitrogen monoxide can also be observed.

$$2C + 2NO \rightarrow N_2 + 2CO$$

In the case of an active regeneration of a particle filter by burning of the soot particles there is likewise the risk that soot charges of the particle filter are high enough that due to the exothermic carbon oxidation in the particle filter, a severe temperature increase of above 1000° C. develops. In the case of such a severe temperature increase damage to the particle filter and/or exhaust gas retreatment assemblies connected downstream can occur. As already explained, this is also problematic in the case of a passive regeneration of a particle. Here, too, a temperature increase of over 1000° C. in the particle filter can occur as a result of a severe exothermic reaction, as a result of which the particle filter and/or exhaust gas retreatment assemblies connected downstream of the same in turn are exposed to a damage hazard.

To date it is not possible, in particular when with a passive regeneration of a particle filter an uncontrolled burning-off of fine material particles or soot particles occurs in the particle filter, to detect this in time. Furthermore, it is not possible to date in particular when fine material particles or soot particles in terms of active regeneration burn off in a controlled or alternatively uncontrolled manner, to safely and reliably determine the degree of charging of the particle filter with soot prior to the soot burn-off and/or the temperature increase of the particle filter as a consequence of the soot burn-off and/or a speed of the soot burn-off.

SUMMARY OF THE INVENTION

In consideration of the foregoing problems, it is an object of the present invention to create a new type of exhaust gas retreatment system of an internal combustion engine and a method for operating such an exhaust gas retreatment system.

This object is solved through an exhaust gas retreatment system, having a first sensor for measuring the oxygen content and/or the NOx content in the exhaust gas downstream of the particle filter positioned in the flow direction of the exhaust gas downstream of the particle filter.

With the invention it is proposed for the first time to position a sensor downstream of a particle filter, which serves to measure the oxygen content and/or the NOx content in the exhaust gas. With the help of such a sensor it is possible, with active regeneration and with passive regeneration of a particle filter, to reliably deduce the soot burn-off that is occurring within a short time. Furthermore, based on the measurement signal provided by this sensor, i.e., based on the oxygen content or NOx content in the exhaust gas downstream of the particle filter determined by the first sensor, the charge condition of the particle filter with soot before the soot burn-off and/or the temperature increase of the particle filter as a consequence of the soot burn-off and/or the speed of the soot burn-off can be easily and reliably determined.

Preferentially, the first sensor for measuring the oxygen content or NOx content in the exhaust gas is positioned in the flow direction of the exhaust gas directly downstream of the particle filter, namely in flow direction of the exhaust gas upstream of the, or each, further exhaust gas retreatment assembly connected downstream of the particle filter. This configuration is advantageous since in this case neither a signal delay through too large a distance between the particle filter and the first sensor nor a signal distortion through exhaust gas retreatment assemblies connected downstream of the particle filter are to be expected.

According to an advantageous further development, a second sensor for measuring the oxygen content or NOx content in the exhaust gas is positioned in the flow direction of the exhaust gas directly upstream of the particle filter, namely in the flow direction of the exhaust gas downstream of the, or each, further exhaust gas retreatment assembly connected upstream of the particle filter. This advantageous further development of the invention is of significance in particular when, during the dynamic operation of the exhaust gas retreatment system or of an internal combustion engine, the charging of the particle filter with soot and/or the temperature increase of the particle filter and/or the speed of the soot burn-off are to be determined.

A control device processes the oxygen content or NOx content measured by the first sensor and the second sensor where applicable.

In a method according to the invention for operating such an exhaust gas retreatment system, during a soot burn-off in the particle filter, namely with an uncontrolled soot burn-off upon passive regeneration of the particle filter or upon a controlled soot burn-off with active regeneration of the particle filter, a charge of the particle filter with soot before the soot burn-off and/or a temperature increase of the particle filter as a consequence of the soot burn-off and/or a speed of the soot burn-off is determined at least on the basis of the oxygen content or NOx content in the exhaust gas downstream of the particle filter measured by the first sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the following description. Exemplary embodiments of the invention are explained in more detail with the help of the drawings without being restricted to this. In the drawings.

DETAILED DESCRIPTION OF THE PRESENTLY PREFERRED EMBODIMENTS

Figure 1:
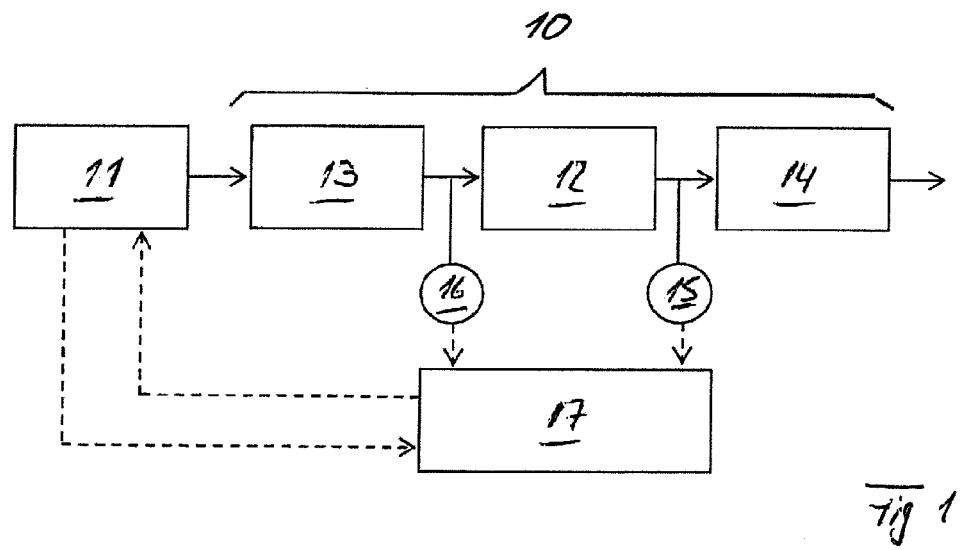
FIG. 1 is a schematic representation of an exemplary embodiment of an exhaust gas retreatment system of an internal combustion engine according to the invention.

FIG. 1 shows a schematic representation of an exhaust gas retreatment system 10 of an internal combustion engine 11, wherein according to FIG. 1 the exhaust gas retreatment system 10 comprises a particle filter 12. The exhaust gas retreatment system 10 further comprises at least one exhaust gas retreatment assembly 13 positioned, in the flow direction of the exhaust gas, upstream of the particle filter 12 and at least one exhaust gas retreatment assembly 14 positioned, in the flow direction of the exhaust gas, downstream of the particle filter 12.

An exhaust gas retreatment assembly 13 positioned, in the flow direction of the exhaust gas, upstream of the particle filter 12 is preferentially an oxidation catalytic converter.

An exhaust gas retreatment assembly 14 positioned, in the flow direction of the exhaust gas, downstream of the particle filter 12 preferentially is an SCR-catalytic converter and/or a silencer and/or a desulpherisation assembly and/or a heat exchanger.

In terms of the present invention it is proposed to position a first sensor 15, in the flow direction of the exhaust gas downstream of the particle filter 12, which serves for the measurement of the oxygen content and/or of the NOx content in the exhaust gas downstream of the particle filter 12. This first sensor 15 for measuring the oxygen content in the exhaust gas is preferentially positioned, in the flow direction of the exhaust gas, directly downstream of the particle filter 12, namely in the flow direction of the exhaust gas upstream of each further exhaust gas retreatment assembly 14 connected downstream of the particle filter 12.

Preferentially, a second sensor 16 for measuring the oxygen content and/or the NOx content in the exhaust gas is present, which, in the flow direction of the exhaust gas, is positioned directly upstream of the particle filter 12, namely in the flow direction of the exhaust gas downstream of each further exhaust gas retreatment assembly 13 connected upstream of the particle filter 12. This second sensor, although preferred, is optional.

The first sensor 15, which, in the flow direction of the exhaust gas, is positioned directly downstream of the particle filter 12, and the second sensor 16 which is present if applicable, which, in the flow direction of the exhaust gas, is positioned directly upstream of the particle filter 12, are preferentially lambda sensors and/or NOx sensors each.

According to FIG. 1, the exhaust gas retreatment system 10 further comprises a control device 17, which processes the oxygen content and/or NOx content in the exhaust gas measured by the first sensor 15 and the second sensor 16 which is present if appropriate.

The control device 17 in this case serves to carry out the method according to the invention, the method according to the invention being described in detail in the following making reference to FIG. 2.

Figure 2:
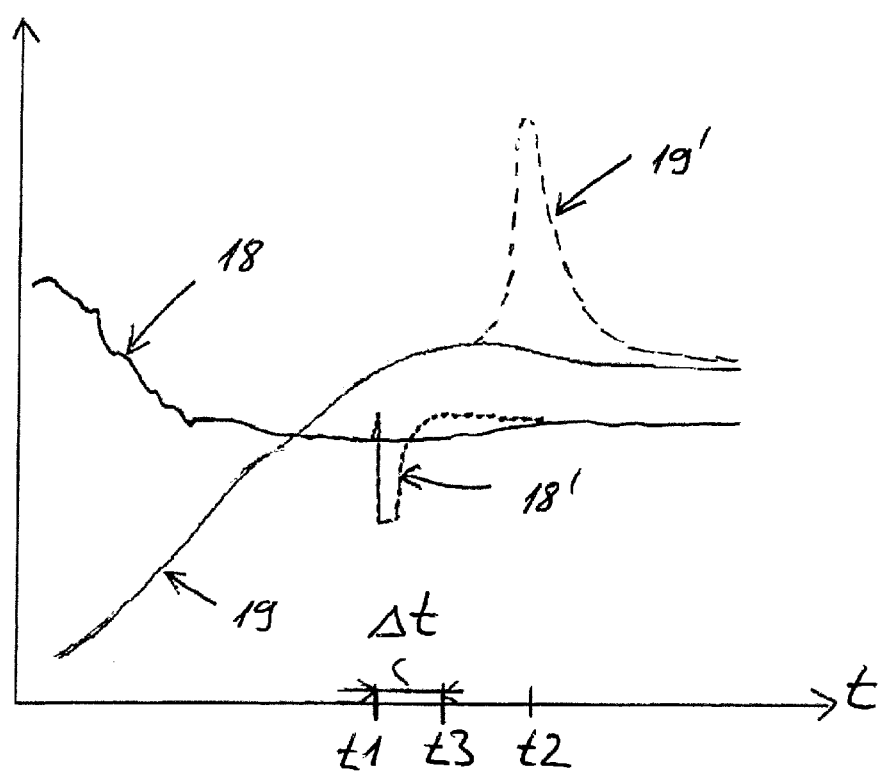
FIG. 2 is a time diagram for illustrating the method according to the invention.

In FIG. 2, multiple curve profiles 18, 18', 19, 19' are shown over the time.

The curve profiles 18 and 18' are each a measurement signal provided by the first sensor 15, i.e., the oxygen content detected by measurement with the help of the first sensor 15 in the exhaust gas downstream of the particle filter 12.

The curve profiles 19 and 19' are each temperatures of the particle filter 12 forming during the operation.

The curve profiles 18 and 19, which are shown in continuous line, concern the operating case of the particle filter 12 and thus of the exhaust gas retreatment system 10, in which, through active regeneration of the particle filter 12, the exhaust gas temperature is increased and a controlled soot burn-off takes place.

The curve profiles 18' and 19', shown in dashed line, by contrast visualize an operating situation of the particle filter 12, in which at the time t1, upon active regeneration of the particle filter 12, an uncontrolled soot burn-off takes place in the particle filter 12.

Thus, it is evident from FIG. 2 that directly with the commencement of the uncontrolled, sudden soot burn-off at the time t1, a reaction, namely a steep drop of the oxygen content, can be determined in the measurement signal 18' provided by the first sensor 15. A temperature increase on the particle filter 12, as a consequence of such an uncontrolled soot burn-off, however, can only be determined with a temperature sensor at the time t2. At the time t3, however, the soot burn-off in the particle filter 12 is largely concluded.

With the method according to the invention it is now proposed, upon a soot burn-off in the particle filter 12, namely upon both an uncontrolled soot burn-off with passive regeneration of the particle filter 12 as well as with controlled soot burn-off upon active regeneration of the particle filter 12, to determine the charge of the particle filter 12 with soot before the soot burn-off and/or the temperature increase of the particle filter 12 as a consequence of the soot burn-off and/or the speed of the soot burn-off at least based on the oxygen content and/or NOx content downstream of the particle filter 12 determined by the first sensor 15.

During stationary operation of the exhaust gas retreatment system, the measurement signal provided by the first sensor 15, i.e., the oxygen content and/or the NOx content in the exhaust gas downstream of the particle filter 12 is sufficient for this purpose. However, during dynamic operation of the exhaust gas retreatment system 10, by contrast, in particular when the operating point of the internal combustion engine 11 changes, an oxygen content and/or NOx content in the exhaust gas upstream of the particle filter 12 that is calculated or determined with the help of the second sensor 16 through measurement is additionally used for this purpose, wherein the determining of the above quantities then takes place based on a difference between the oxygen content downstream of the particle filter 12 and the oxygen content upstream of the particle filter 12. From the oxygen content and/or the NOx content in the exhaust gas downstream of the particle filter 12, which is measured by the first sensor 15, and during the dynamic operation from the calculated or measured oxygen content or NOx content in the exhaust gas upstream of the particle filter 12, and an exhaust gas flow rate or exhaust gas mass flow made available to the control device 17 by the internal combustion engine 11 the burnt off soot quantity can be determined according to the following equation:

$$C+O_2 \rightarrow CO_2$$

$$2C+2NO_2 \rightarrow N_2+2CO_2$$

$$2C+2NO \rightarrow N_2+2CO$$

Here, each burnt oxygen molecule or NOx molecule corresponds to a carbon molecule. Through integration over the time the charge of the particle filter 12 with soot before the soot burn-off can thus be determined.

The temperature increase of the particle filter 12 as a consequence of the soot burn-off can be determined according to the following equation:

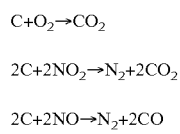

where $\Delta T$ corresponds to the temperature increase as a consequence of the soot burn-off, $m_c$ the charge of the particle filter with soot before the soot burn-off, $Hu_c$ the calorific value of the soot, $m_{exhaust\ gas}$ corresponds to the exhaust gas mass throughput, and $\alpha_{exhaust\ gas}$ to the heat capacity of the exhaust gas, $m_{Filter}$ to the filter mass, $\alpha_{Filter}$ to the heat capacity of the filter.

The duration $\Delta t$ of the soot burn-off can be likewise determined from the signal 18' provided by the sensor 15, wherein according to FIG. 2 the soot burn-off at the time t3 is concluded in particular when after the drop of the measurement signal 18' and the subsequent rise of the same, the same assumes an approximately constant value. From the time derivation of the measurement signal 18' the speed of the soot burn-off in the particle filter 12 can be deduced.

$$dT/dt \approx dO_2/dt$$

$$dT/dt \approx dNOx/dt$$

In particular when it is determined that the temperature increase of the particle filter 12 determined and expected from the measurement signal of the first sensor 15 as a consequence of the soot burn-off is too great, i.e., greater than a limit value stored in the control device 17, it is possible to influence the operation of the internal combustion engine 11 so that the temperature increase of the particle filter 12 is reduced in order to thereby counteract a risk of damaging the particle filter.

To this end it is possible, for example via appropriate throttling of the internal combustion engine 11, to reduce the fresh air supply of the same in order to ultimately lower the oxygen content in the exhaust gas. Thus, the operation of the internal combustion engine 11 can be directly influenced, in particular when at the time t1 the commencement of a soot burn-off is detected, so that a reduced and uncritical temperature increase of the particle filter 12 develops.

The temperature increase of the particle filter 12 as a consequence of a soot burn-off and/or the charging of the particle filter 12 with soot before the soot burn-off can be stored in the control device 17. In particular, when the temperature increase as a consequence of the soot burn-off is too great and/or the charge of the particle filter 12 with soot before the soot burn-off is too great, a diagnosis message for the particle filter 12 and/or for the internal combustion engine 11 is preferentially generated, stored in the control device 17 and displayed if appropriate. In this way, maintenance of the particle filter 12 can be initiated in particular when a temperature increase of the same was too great. Furthermore, maintenance on injection nozzles and/or of the turbocharger of the internal combustion engine 11 can be initiated in particular when the charge of the particle filter with soot is too great because of soot raw emissions that are too high, caused, for example, through high nozzle or turbocharger wear.

According to a further advantageous further development of the invention it can be provided to compare the charge of the particle filter 12 with soot before the soot burn-off and/or the temperature increase of the particle filter 12 as a consequence of the soot burn-off and/or the speed of the soot burn-off determined with the help of the method according to the invention with corresponding quantities of a soot charge model of the particle filter 12 stored in the control device. Soot charge models, in the case of which the quantity deposited in the particle filter is determined with the help of algorithms and engine operating values such as charge pressure, injection pressure etc., are prior art so that this is not discussed further at this point. Currently, the particle filter charge cannot be determined based on missing or insufficiently accurate sensor system, so that a comparison of the charge model with actual values is not possible. This results in that, for example, a drifting of the real values cannot be detected and the soot charge model accordingly does not supply correct values.

This is where the method comes in: in particular when at least one value determined as a function of the measurement signal of the first sensor 15 deviates from the corresponding quantity of the charge model of the particle filter 12, a correction value can be determined for the adaptation of the charge model of the particle filter 12 based on the deviation in order to adapt the charge model of the particle filter 12 with the help of the correction value.

In particular, when a charge of the particle filter 12 with soot and the temperature increase of the particle filter 12 as a consequence of the soot burn-off determined based on the measurement signal of the first sensor 15 are below critical limit values and the corresponding values moreover coincide with the corresponding quantities of the charge model, no action in terms of control is required.

In particular, when the temperature increase of the particle filter determined as a consequence of the soot burn-off and/or the determined charge of the particle filter with soot are below critical limit values, but these values however deviate from the corresponding quantities determined in the control device 17, an adaptation of the charge model through the determination of at least one characteristic value can take place. Upon active filter regeneration, this adaptation for example results in a change of the regeneration intervals.

In particular, when the temperature increase of the particle filter determined as a consequence of the soot burn-off and/or the determined charge of the particle filter with soot are above critical limit values, at least one diagnosis message is generated as already mentioned above and/or the temperature increase actively counteracted by influencing the operation of the internal combustion engine 11.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An exhaust gas retreatment system of an internal combustion engine, comprising:
   a particle filter (12);
   a first sensor (15) positioned, in a flow direction of the exhaust gas, directly downstream of the particle filter (12), the first sensor (15) being configured to measure, in the exhaust gas downstream of the particle filter (12), at least one selected from the group consisting of: oxygen content and NOx content;
   a first exhaust gas retreatment assembly (13) arranged upstream of the particle filter (12);
   a second exhaust gas retreatment assembly (14) arranged downstream of the particle filter (12);
   a second sensor (16) configured to measure at least one selected from the group consisting of: the oxygen content and the NOx content in the exhaust gas, the second sensor (16) being positioned, in the flow direction of the exhaust gas, directly upstream of the particle filter (12), and directly downstream of the first exhaust gas retreatment assembly (13) connected upstream of the particle filter (12); and
   a control device (17) configured to:
      process the oxygen content or NOx content measured by the first sensor (15) and the second sensor (16), and
      upon a soot burn-off in the particle filter, determine a temperature increase of the particle filter as a consequence of the soot burn-off and a speed of the soot burn-off based on at least one selected from the group consisting of: the oxygen content and the NOx content in the exhaust gas downstream of the particle filter measured by the first sensor,
   wherein the first sensor (15) is positioned, in the flow direction of the exhaust gas, directly upstream of the second exhaust gas retreatment assembly (14) connected downstream of the particle filter (12), and
   wherein, when it is determined that the temperature increase of the particle filter as a consequence and speed of the soot burn-off is too great, the control device (17) generates, stores and displays at least one diagnosis message for initiation of maintenance of the internal combustion engine.

2. The exhaust gas retreatment system according to claim 1, wherein each of the first sensor (15) and the second sensor (16) is a sensor selected from the group consisting of a lambda sensor and an NOx sensor.

3. A method for operating an exhaust gas retreatment system according to claim 1, the method comprising:

upon a soot burn-off in the particle filter, determining a temperature increase of the particle filter as a consequence of the soot burn-off and a speed of the soot burn-off based on at least one selected from the group consisting of: the oxygen content and the NOx content in the exhaust gas downstream of the particle filter measured by the first sensor;

during dynamic operation of the exhaust gas retreatment system, using an oxygen content and/or NOx content in the exhaust gas upstream of the particle filter that is calculated or measured using the second sensor to determine the temperature increase of the particle filter as a consequence of the soot burn-off and of the speed of the soot burn-off; and when it is determined that the temperature increase of the particle filter as a consequence of the soot burn-off is too great, adjusting operation of an internal combustion engine connected upstream of the exhaust gas retreatment system so as to reduce the temperature increase.

4. The method according to claim 3, further comprising:

when it is determined that the temperature increase of the particle filter as a consequence of and speed of the soot burn-off is too great, storing and displaying at least one diagnosis message for the internal combustion engine connected upstream of the exhaust gas retreatment system.

5. The method according to claim 4, further comprising:

comparing the determined temperature increase of the particle filter as a consequence of the soot burn-off and the speed of the soot burn-off with corresponding quantities of a charge model of the particle filter; and when at least one determined value deviates from the corresponding quantities of the charge model of the particle filter, determining a correction value for the adaptation of the charge model of the particle filter.

* * * * *